United States Patent
Sprague

(10) Patent No.: US 8,753,505 B2
(45) Date of Patent: Jun. 17, 2014

(54) LIQUID TREATMENT APPARATUS AND METHOD FOR USING SAME

(75) Inventor: Allison Sprague, Prescott (CA)

(73) Assignee: Fluid-Quip, Inc., Springfield, OH (US)

( * ) Notice: Subject to any disclaimer, the term of this patent is extended or adjusted under 35 U.S.C. 154(b) by 818 days.

(21) Appl. No.: 12/492,471

(22) Filed: Jun. 26, 2009

(65) Prior Publication Data

US 2009/0321367 A1 Dec. 31, 2009

Related U.S. Application Data

(60) Provisional application No. 61/076,241, filed on Jun. 27, 2008.

(51) Int. Cl.
*B01D 33/70* (2006.01)

(52) U.S. Cl.
USPC ........... 210/153; 210/253; 210/749; 210/150; 210/742; 210/743; 210/103; 210/137; 210/194; 210/258; 209/718; 209/727; 138/45; 422/186.04; 422/186.03; 422/20; 422/24; 422/127

(58) Field of Classification Search
USPC ............ 210/150, 764, 758, 749, 748.01, 748, 210/153, 96.1, 97, 103, 137, 194, 252, 253, 210/258, 259, 257.1, 266, 669, 742, 743, 210/909; 422/186.04, 20, 186.03, 24, 127; 209/727, 718; 138/45, 16
See application file for complete search history.

(56) References Cited

U.S. PATENT DOCUMENTS

| | | | |
|---|---|---|---|
| 2,671,560 A | 6/1954 | Fontein et al. | |
| RE25,099 E | 12/1961 | Hoffman | |
| 3,261,467 A | 7/1966 | Wikdahl | |
| 3,415,374 A | 12/1968 | Wikdahl | |
| 3,486,618 A | 12/1969 | Wikdahl | |

(Continued)

FOREIGN PATENT DOCUMENTS

| EP | 0948400 | 7/2003 |
|---|---|---|
| GB | 2016940 | 9/1979 |
| WO | 9811983 | 3/1998 |

OTHER PUBLICATIONS

Kalumuck, Chahine, Hsiao, Choi; Remediation and Disinfection of Water Using Jet Generated Cavitation; Nov. 1-4, 2003; 8 pages; Fifth International Symposium of Cavitation; Osaka, Japan.

(Continued)

*Primary Examiner* — Joseph Drodge
*Assistant Examiner* — Cameron J Allen
(74) *Attorney, Agent, or Firm* — Wood, Herron & Evans, LLP

(57) ABSTRACT

An apparatus for treating a liquid includes a first flow generator having an outlet for generating a first flow stream and a reaction chamber positioned in proximity to the outlet of the first flow generator and having a cavity adapted to receive the first flow stream from the first flow generator and reverse its direction within the confined space of the cavity. The flow generator may be a cavitation generator for producing multiple cavitation bubbles in the first slow stream, or a nozzle for generating a flow stream devoid of cavitation bubbles. A method for treating a liquid includes directing the liquid into a first flow generator configured to generate a first flow stream of the liquid, and directing the first flow stream from the first flow generator into a cavity of a reaction chamber.

7 Claims, 6 Drawing Sheets

(56) References Cited

U.S. PATENT DOCUMENTS

| | | |
|---|---|---|
| 3,551,073 A | 12/1970 | Petrovits |
| 3,598,731 A | 8/1971 | Frykhult et al. |
| 3,852,191 A | 12/1974 | Zucker et al. |
| 3,937,445 A | 2/1976 | Agosta |
| 3,959,123 A | 5/1976 | Wikdahl |
| 4,127,332 A | 11/1978 | Thiruvengadam et al. |
| 4,217,414 A | 8/1980 | Walon |
| 4,260,480 A * | 4/1981 | Lewis et al. .................. 209/728 |
| 4,389,071 A | 6/1983 | Johnson, Jr. et al. |
| 4,416,701 A | 11/1983 | Huster et al. |
| 4,416,989 A | 11/1983 | Kretz |
| 4,474,251 A | 10/1984 | Johnson, Jr. |
| 4,508,577 A | 4/1985 | Conn |
| 4,681,264 A | 7/1987 | Johnson, Jr. |
| 4,716,218 A | 12/1987 | Chen et al. |
| 4,716,849 A | 1/1988 | Conn |
| 4,810,647 A | 3/1989 | Monceaux et al. |
| 4,906,387 A | 3/1990 | Pisani |
| 4,944,163 A | 7/1990 | Niggemann |
| 5,388,708 A * | 2/1995 | Bouchillon et al. .......... 209/728 |
| 5,393,417 A * | 2/1995 | Cox ............................ 210/96.1 |
| 5,410,021 A | 4/1995 | Kampen |
| 5,492,654 A | 2/1996 | Kozyuk et al. |
| 5,494,585 A * | 2/1996 | Cox .......................... 210/748.11 |
| 5,500,134 A | 3/1996 | Chahine |
| 5,628,623 A | 5/1997 | Skaggs |
| 5,688,674 A | 11/1997 | Choi et al. |
| 5,810,052 A | 9/1998 | Kozyuk |
| 5,810,474 A | 9/1998 | Hidalgo |
| 5,868,495 A | 2/1999 | Hidalgo |
| 5,931,771 A | 8/1999 | Kozyuk |
| 5,937,906 A | 8/1999 | Kozyuk |
| 5,969,207 A | 10/1999 | Kozyuk |
| 5,971,601 A | 10/1999 | Kozyuk |
| 6,012,492 A | 1/2000 | Kozyuk |
| 6,024,874 A | 2/2000 | Lott |
| 6,035,897 A | 3/2000 | Kozyuk |
| 6,200,486 B1 | 3/2001 | Chahine |
| 6,221,260 B1 | 4/2001 | Chahine |
| 6,318,649 B1 | 11/2001 | Mazurkiewicz |
| 6,386,751 B1 | 5/2002 | Wootan et al. |
| 6,502,979 B1 | 1/2003 | Kozyuk |
| 6,538,041 B1 | 3/2003 | Marelli |
| 6,737,099 B2 | 5/2004 | Guraya |
| 6,802,639 B2 | 10/2004 | Kozyuk |
| 6,824,086 B1 | 11/2004 | Mazurkewicz et al. |
| 6,857,774 B2 | 2/2005 | Kozyuk |
| 6,896,819 B2 | 5/2005 | Morse |
| 7,056,437 B2 | 6/2006 | Schmid et al. |
| 7,086,777 B2 | 8/2006 | Kozyuk |
| 7,087,178 B2 | 8/2006 | Romanyszyn et al. |
| 7,101,691 B2 | 9/2006 | Kinley et al. |
| 7,135,155 B1 | 11/2006 | Long, Jr. et al. |
| 7,138,257 B2 | 11/2006 | Galli et al. |
| 7,178,975 B2 | 2/2007 | Kozyuk |
| 7,207,712 B2 | 4/2007 | Kozyuk |
| 7,247,244 B2 | 7/2007 | Kozyuk |
| 7,314,306 B2 | 1/2008 | Kozyuk |
| 7,452,425 B1 | 11/2008 | Langhauser |
| 7,504,245 B2 | 3/2009 | Kinley et al. |
| 2002/0009414 A1 | 1/2002 | Moser et al. |
| 2002/0054995 A1 | 5/2002 | Mazurkiewicz |
| 2004/0028622 A1 | 2/2004 | Gurin |
| 2004/0103783 A1 | 6/2004 | Hudson et al. |
| 2004/0187863 A1 | 9/2004 | Langhauser |
| 2005/0233030 A1 | 10/2005 | Lewis et al. |
| 2005/0239181 A1 | 10/2005 | Lewis et al. |
| 2006/0126428 A1 | 6/2006 | Hudson et al. |
| 2006/0286654 A1 | 12/2006 | Kinley et al. |
| 2007/0037267 A1 | 2/2007 | Lewis et al. |
| 2007/0066480 A1 | 3/2007 | Moser et al. |
| 2007/0152355 A1 | 7/2007 | Hartley |
| 2007/0161095 A1 | 7/2007 | Gurin |
| 2007/0178567 A1 | 8/2007 | Lewis |
| 2007/0181509 A1 * | 8/2007 | Araiza et al. .................. 210/748 |
| 2007/0202214 A1 | 8/2007 | Lewis et al. |
| 2008/0044891 A1 | 2/2008 | Kinley et al. |
| 2008/0099410 A1 | 5/2008 | Sprague |
| 2008/0277264 A1 | 11/2008 | Sprague |
| 2008/0281131 A1 | 11/2008 | Kozyuk |
| 2009/0043118 A1 | 2/2009 | Kozyuk |

OTHER PUBLICATIONS

MBA Polymers; Development of Hydrocyclones for Use in Plastics Recycling; Jul. 1998; 42 pages; Richmond, CA.

Suslick, Kenneth S.; The Chemical Effects of Ultrasound; Feb. 1989; 7 pages; Scientific American.

Eimco Water Technologies; Eimco Sonolyzer, Sludge Disintegration and Minimization; copyright 2004; 4 pages.

Gedanken, Aharon; Sonochemistry and its Application in Materials Science; undated; 4 pages.

Neis, U and Blume, T.; Ultrasonic Disinfection of Wastewater Effluents for High-Quality Reuse; Sep. 26-29, 2002; 8 pages; IWA Regional Symposium on Water Recycling in Mediterranean Region, Iraklio, Greece.

Hua, Inez, An Investigation of Homogeneous and Heterogeneous Sonochemistry for the Destruction of Hazardous Substances; 1996-1997; 32 pages; Purdue University, West Lafayette, IN.

* cited by examiner

LIQUID TREATMENT APPARATUS AND METHOD FOR USING SAME

CROSS-REFERENCE TO RELATED APPLICATION

This application claims priority to U.S. provisional patent application Ser. No. 61/076,241 filed on Jun. 27, 2008, the disclosure of which is expressly incorporated by reference herein in its entirety.

TECHNICAL FIELD

The invention relates to a liquid treatment apparatus for treating a liquid medium and, more particularly, to an apparatus and method for enhancing chemical reactions occurring in processes utilizing hydraulic cavitation.

BACKGROUND

Many industrial processes rely on various chemical reactions in a liquid medium to achieve a certain end product. Accordingly, manufacturers and others that perform these industrial processes continually seek improvements to these processes so as to improve their efficiency and provide a cost benefit. By way of example, increasing the efficiency in chemical reactions occurring in a liquid medium may result in a decrease in processing time, which may lead to an increase in overall production and decrease in operating costs, and/or a decrease in chemical consumption in the liquid medium for achieving the desired result which may reduce operating costs. These are only exemplary and, depending of the specific application, many other benefits may be gained by improving the efficiency of various chemical reactions.

One industrial application that may benefit from improved chemical reactions is in the treatment of liquid mediums using cavitation. For example, the use of cavitation in the treatment of contaminated water, e.g., wastewater, is documented. In these cavitation methods, the goal is to generate many fine bubbles, which upon their implosion create intense, but highly localized temperatures and pressures. This energy release then causes dissolution of the water molecules and the creation of free hydroxyl radicals. The potential of these powerful radicals for the beneficial treatment of the water has been well recognized for many years. However, the inefficiencies in the known processes for generating cavitation within a liquid (e.g., ultrasonic or jet cavitation) has restricted commercial acceptance of hydraulic cavitation.

Recently, an apparatus for generating hydraulic cavitation within a liquid medium in an efficient manner has been proposed in U.S. Publication No. 2008/0099410, the disclosure of which is incorporated by reference herein in its entirety and which is assigned to the assignee of the present application. FIGS. 1-4 of the present disclosure illustrate an exemplary embodiment of a modified cyclonette 10 for generating cavitation and a liquid treatment apparatus 12 that utilizes modified cyclonette 10 to treat a liquid medium, such as wastewater, using cavitation.

In this regard, cyclonette 10 includes an insert 14 installed in the left hand end thereof and may be provided with an annular groove 16 into which an O-ring 18 may be seated. To the right of the O-ring 18, a second annular groove 20 may be formed to receive a second O-ring 22 of more or less rectangular cross-sectional configuration. Interiorly of the cyclonette 10, a flow path is provided by a throat portion 23, an inwardly tapering flow channel 24, and an outwardly tapering flow channel 26. If the exiting fluid completely fills the flow channel at its minimum diameter at point 28, the pressure within the upstream channel will be a function of the velocity head of the fluid at this point. If the absolute pressure at point 28 is at or below the vapor pressure of the fluid, or is low enough to cause dissolved gases to move out of solution, a mixed flow of gas and liquid will occur.

As a result of the outwardly tapering flow channel 26 and the momentum of the fluid, there will be a tendency for the static pressure on the wall of the channel to be reduced which in turn will result in a lower pressure within the fluid. As the fluid moves beyond point 28, the internal pressure within the gas bubbles will cause them to expand until pressure equilibrium is established.

At its left-hand end, as seen in FIG. 1, the cyclonette 10 may be provided with an internally threaded socket 30 receiving the complementary external threads 32 of the insert 14. The insert 14 has a straight sided internal bore 34 and captures and holds in place within cyclonette 10 a washer-shaped orifice plate 36 having a central orifice 37. This embodiment has shown to be productive in the formation of multiple tiny bubbles, as the liquid being treated must first constrict from the larger diameter of the insert flow passage 34 to the restricted orifice 37 and then expand again into the throat of cyclonette 10. Lastly, the cyclonette 10 may be provided with a passageway 38 extending through a wall of the cyclonette 10 into the throat portion 23. The passageway 38 may be used for the addition of a flow of the liquid being treated or a chemical or physical modifying substance in either a tangential, radial, or substantially axial direction into the throat 23.

With reference now to FIG. 2, liquid treatment apparatus 12 includes a housing 40 having cylinders 42, each having outwardly projecting annular flanges 44 to permit two or more cylinders 42 to be clamped together by bolts 46 to form a continuous, outer, annular chamber 68. At its upper end, the annular outer chamber is capped by a closure plate 50 having a lifting ring 52. The closure plate 50 is clamped to the upper end of the uppermost cylinder 42 in a manner similar to the clamping between adjacent cylinders by means of bolts 46.

With reference now to FIGS. 2 and 3, it will be seen that the lowermost cylinder 42 is attached at its lower end by means of bolts 46 to a manifold system 54. At its upper end, the manifold system 54 has an outwardly projecting annular flange 56 to which the lower most cylinder 42 is clamped by the bolts 46 as shown in FIG. 3. The manifold system 54 comprises three concentric flow channels, namely, an outer feed channel 58, a central, outwardly-flowing channel 60, and an intermediate channel 62, which may or may not be used.

As seen in FIG. 2, positioned concentrically within the outer cylinders 42 are intermediate cylinders 64 and inner cylinders 66, which are each superimposed upon each other and clamped by the clamping action between the outer cylinders, the top plate 50 and the lower annular rim 56 of the manifold system 54. It will thus be apparent with reference to FIGS. 2 and 3 that the outer and intermediate cylinders form the annular outer chamber 68 communicating with the outer feed manifold 58, an inner or central chamber 70, communicating with the manifold 60, and an intermediate chamber 72 communicating with the manifold 62.

As best seen in FIG. 4, adjoining sets of intermediate and inner cylinders may be provided with annular grooves 74 and 76 to receive any convenient sealing means. Intermediate cylinders 64 are also provided with closely spaced openings 78 to receive modified cyclonettes which may be more or less of the type shown in FIG. 1 or of various modified forms more fully disclosed in U.S. Publication No. 2008/0099410. In any case, the cyclonettes are secured in any convenient manner in the openings 78 with the opposite ends of the cyclonettes being received in openings 80 in the cylinders 66. In FIG. 4, the openings 78 are shown as having internal threads, which could receive complementary external threads on the exterior of the cyclonettes. In this regard, O-rings, such as those shown at 16 and 20 in FIG. 1, may be utilized to create seals with the cylinders 64 and 66, respectively.

However, any convenient means may be utilized to secure the cyclonettes in the intermediate and interior cylinders 64 and 66. In any case, the positioning of a cyclonette, regardless of its specific configuration, in the manner shown in FIG. 4 permits the liquid delivered through the outer manifold 58 and into the annular outer chamber 68 to flow into an insert 14 and then into the upstream end of the cyclonette and out its downstream end where it is immersed in the liquid being treated, which is being collected in the inner or central cylindrical chamber 70 and then out through the manifold 60.

As seen in FIG. 4, it is contemplated that hundreds, perhaps even a thousand or more of cyclonettes, will be arrayed in a single housing 40 of liquid treatment apparatus 12. Each cyclonette may be disposed opposite another, resulting in direct impingement of the flow from one cyclonette upon the opposite flow from an opposing cyclonette.

In use, the manifold 58 is the feed manifold for the system, delivering the liquid to be treated to the upstream or left-hand end of the insert 14 from whence the flow is ejected in an axial jet out the orifice plate 36 of the insert 14 and into the flow channel 24. This action results in the generation of shear zones that create a myriad of tiny bubbles, each of which, upon implosion, create highly localized areas of extreme pressures and temperatures.

This in turn results in dissolution of the water molecules into, inter alia, aggressive hydroxyl radicals. While in its most straightforward form the passageway 38 in the upstream end of the cyclonette will not be utilized, alternatively, a supply of the liquid being treated may be fed via the intermediate manifold 62 and the intermediate chamber 72 into the passageways 36 to provide an additional flow and hence an intensifying of the shear zone to enhance the formation of the tiny bubbles as liquid flows through the flow channel 24 of the cyclonette 10.

The cyclonette 10 and/or apparatus 12 for generating and utilizing cavitation for the treatment of a liquid medium may find application in a host of additional industrial processes. By way of example, U.S. Publication No. 2008/0277264, the disclosure of which is incorporated by reference herein in its entirety and which is assigned to the assignee of the present application, discloses using liquid treatment apparatus 12 to generate cavitation in the production of ethanol. More particularly, as disclosed therein, certain benefits may be achieved by including one or more hydraulic cavitation processing steps in a conventional dry grind process, modified dry grind process, or a wet mill process.

While the cyclonettes 10 and liquid treatment apparatus 12 as disclosed more fully in U.S. Publication No. 2008/0099410 are believed to be adequate for various applications, such as in ethanol production, there are some drawbacks. For example, while the designs disclosed in U.S. Publication No. 2008/0099410 focus on the design of the cyclonettes 10 so as to maximize cavitation generation, it may be desirable to design the liquid treatment apparatus 12 so as to optimize the collapse of the cavitation bubbles generated by cyclonettes 10. In this regard, the liquid treatment apparatus 12 as disclosed in U.S. Publication No. 2008/0099410 discharges the fluid jet containing the cavitations bubbles into a large body of fluid (e.g., chamber 70) where the cavitation bubbles will eventually collapse. While such a method provides a certain level of effectiveness in generating hydroxyl radicals in the liquid medium, more efficient methodologies of bubble collapse are being sought.

SUMMARY

An apparatus for treating a liquid includes a first flow generator having an outlet for generating a first flow stream of the liquid being treated and a reaction chamber positioned in proximity to the outlet of the first flow generator and having a cavity adapted to receive the first flow stream from the first flow generator. In one embodiment, the first flow generator includes a cavitation generator, such as, for example, a cyclonette, adapted to generate a first flow stream including multiple cavitation bubbles. In another embodiment, the first flow generator includes a nozzle adapted to generate a first flow stream substantially devoid of cavitation. In the former embodiment, the reaction chamber may be configured to facilitate bubble collapse and therefore enhance treatment of the liquid. In the latter embodiment, the reaction chamber may be configured to facilitate turbulence and mixing so as to enhance treatment of the liquid.

The cavity in the reaction chamber may include a blind bore having at least one side wall and a base wall. The bore may have a relatively constant cross-sectional area along the length of the bore or alternatively, have a cross-sectional area that varies along the length of the bore, such as by having a tapered or arcuate side wall. By way of example, the cavity may include a blind bore configured as a cylindrical bore, a tapered bore, or a generally arcuate bore.

In one embodiment, the apparatus may include a second flow generator having an outlet for generating a second flow stream of the liquid being treated. The second flow generator may be directly opposed to the first flow generator, such that the first and second flow streams intersect each other. In this embodiment, the cavity may include a first inlet adapted to receive the first flow stream and a second inlet adapted to receive the second flow stream, wherein the first and second flow streams intersect each other within the cavity. To this end, the cavity may include a first cavity portion and a second cavity portion in fluid communication with each other. In another embodiment utilizing opposed fluid generators, the cavity may include a flow channel defined by a side wall and having a first inlet adapted to receive the first flow stream and a second inlet adapted to receive the second flow stream, wherein the streams intersect within the cavity. A chamber is disposed in the side wall of the flow channel and is configured to receive the fluid streams after intersection thereof. In one embodiment, the chamber includes a multi-lobed configuration.

In another embodiment, an apparatus for treating a liquid includes outer, intermediate and inner cylinders positioned concentrically with respect to each other so as to define an outer annular chamber, an intermediate chamber, and an inner, central chamber. A plurality of flow generators, each having a unidirectional flow channel extending therethrough from adjacent an upstream end to adjacent a downstream end, is mounted in the intermediate cylinder with the upstream ends communicating with the annular outer chamber and the downstream ends communicating with the inner, central chamber. The apparatus further includes an outer feed channel supplying liquid being treated to the outer annular chamber, and a central, outwardly-flowing channel receiving liquid from the flow generators and immersing downstream ends thereof in the liquid being treated. A reaction chamber insert is positioned in the inner, central chamber and includes a plurality of cavities, the insert is configured such that a cavity is positioned in proximity to the downstream end of a corresponding flow generator.

In still another embodiment, a method for treating a liquid includes directing the liquid into a first flow generator configured to generate a first flow stream of the liquid, and directing the first flow stream from the first flow generator into a cavity of a reaction chamber. The first flow generator may be configured to generate cavitation bubbles in the first flow stream. The method may further include bringing the first flow stream to rest within the cavity, reversing the direction of the first flow stream within the cavity, and/or intersecting the first flow stream with itself. For example, in one embodiment, the first flow stream may be directed into a blind bore. In another embodiment, the method may include directing the liquid into a second flow generator configured to generate a second flow stream of the liquid, directing the second flow stream from the second flow generator into the cavity, and causing the first intersection of the first and second flow streams within the cavity resulting in a third flow stream, which may intersect itself or intersect at least one of the first or second flow streams.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
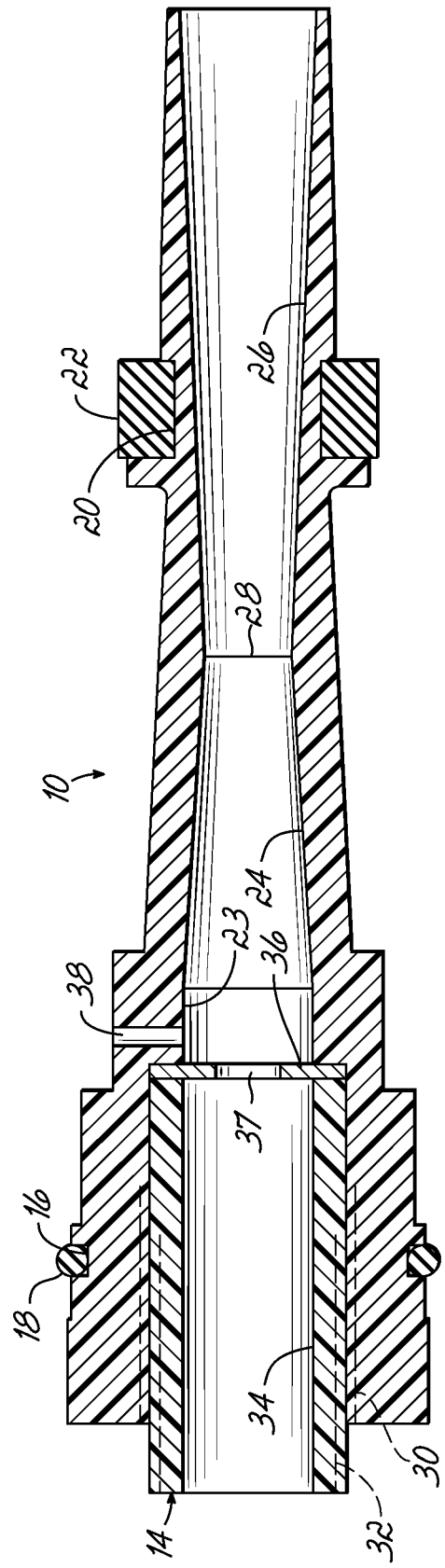
FIG. 1. is an enlarged cross-sectional view of an exemplary cavitation generator in the form of a modified cyclonette.

One approach to increase the efficiency of bubble collapse is to make the cavitation bubbles collapse in a more violent manner. It is believed that this will increase the localized temperature and pressures that occur during bubble collapse. This may be done, for example, by quickly increasing the pressure in the fluid that is exiting the cavitation generator. Moreover, because the fluid exiting the cavitation generator may be moving at a relatively high velocity (e.g., high velocity head), one approach is to use the fluids own energy to quickly increase the pressure in the fluid (e.g., the pressure head). Quickly bringing the fluid to rest or quickly changing the momentum of the fluid flow (e.g., direction of fluid flow) may do this, for example. When this is done, the velocity head decreases and the pressure head of the fluid increases to collapse the cavitation bubbles more efficiently. In this regard, for example, it is believed that as the rate of pressure rise within the bubble is increased, the time of bubble collapse is correspondingly decreased. This in turn reduces the time available for heat to be transferred to the surrounding fluid, resulting in higher vapor temperatures. Moreover, the rate of bubble collapse also influences the maximum pressure attained within the bubble. In this regard, it is believed that a high rate of momentum change increases the PV (pressure×volume) work done on the bubble.

In addition to quickly increasing the pressure of the fluid, it may be beneficial if the fluid flow is quickly brought to rest or is subject to a quick change in momentum within a constrained space or volume. In this regard, constraining the region where the velocity head is transferred to pressure head limits the expansion of the fluid and results in a localized high pressure region within the constrained volume. Additionally, when bubbles collapse, shock waves are formed. When one bubble collapses near another bubble, the shock wave from the first bubble collapse has an interaction with the second bubble and may facilitate its collapse. Accordingly, constraining the volume may increase the fraction of bubbles that quickly collapse and increase interaction among them. Moreover, constraining the volume in the region of bubble collapse (e.g., with a reaction chamber as discussed below) focuses the energy from any pressure or shock waves generated within the flow stream so as to improve chemical or reaction kinetics.

In accordance with an exemplary embodiment of the invention, an increase in the efficiency of cavitation bubble collapse may be achieved using a reaction chamber that facilitates a more violent collapse of cavitation bubbles. In reference to FIG. 5, a liquid treatment apparatus 100 includes a cavitation generator, shown schematically at 102, and a reaction chamber 104 in proximity to cavitation generator 102. In one embodiment, the cavitation generator 102 may be a modified cyclonette 10 as discussed above and more fully disclosed in U.S. Publication No. 2008/0099410. However, the invention is not so limited as other cavitation generators may be used. For instance, ultrasonic and/or other hydraulic cavitation generators may be used to generate a fluid flow with many cavitation bubbles therein.

Figure 5:
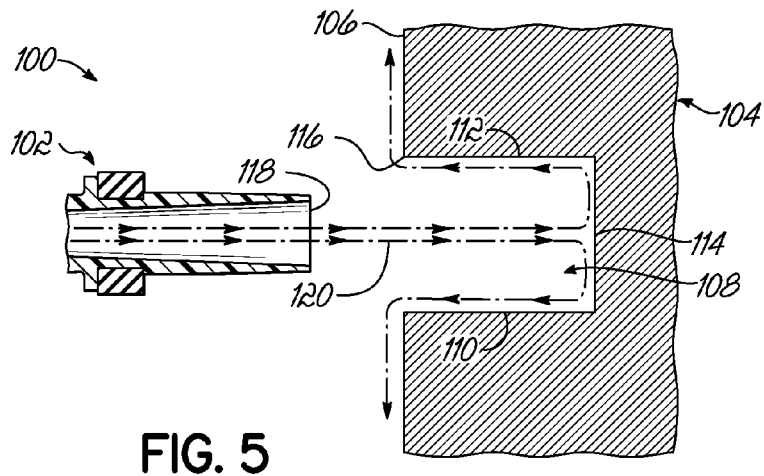
FIG. 5 is a side elevational view of a liquid treatment apparatus, in partial cross section, incorporating a reaction chamber in accordance with one embodiment of the invention.

The reaction chamber 104 includes an external wall 106 having a cavity 108 formed therein. In one embodiment, and as shown in FIG. 5, the cavity 108 may be configured as a straight or right cylindrical blind bore 110 having a side wall 112 and a base wall 114. The blind bore 110 may include a circular cross-sectional shape. However, other cross-sectional shapes, such as square, rectangular, triangular, etc., are also contemplated to be within the scope of the invention. Cavity 108 includes an inlet 116 adjacent a surface of external wall 106 that is positioned adjacent an outlet 118 of the cavitation generator 102 such that the fluid flow from generator 102 is directed through the inlet 116 and into the otherwise closed cavity 108.

The fluid stream from the outlet 118 of cavitation generator 102 generally includes a relatively large velocity head and a relatively low pressure head so as to, for example, facilitate bubble generation within the fluid. As illustrated schematically by the flow lines 120 in FIG. 5, the fluid flow from cavitation generator 102 flows through inlet 116 and interacts with the base wall 114 of cylindrical bore 110. It is believed that the flow stream contacts the base wall 114 and is brought to rest such that the energy in the velocity head is transferred to the pressure head to cause a quick rise in the fluid pressure. The quick increase in fluid pressure causes the cavitation bubbles to collapse. Similar to fluid contacting a flat plate, the flow is deflected so as to flow in a generally radial direction. The fluid stream then contacts the side wall 112 and is redirected back toward the inlet 116 of bore 110. In essence, the side wall 112 constrains the volume in which the transfer of energy from the velocity head to the pressure head takes place and results in a 180 degree reversal of the fluid flow, thus maximizing the change in momentum of the fluid flow.

To accommodate the fluid flow entering and exiting the bore 110, the cross-sectional area of the bore 110 should be greater than the cross-sectional area of the flow stream entering inlet 116 (which should correspond approximately to the cross-sectional area of the outlet 118 of cavitation generator 102). For example, in one embodiment, if the cross-sectional area of the fluid stream is given by $A_s=A_l+A_g$, where $A_l$ is the cross-sectional area of the liquid and $A_g$ is the cross-sectional area of the gas bubbles, then the cross-sectional area of the bore 110 may be given by $A_b=2A_l+A_g$. Such a relation would maximize the change in momentum.

In addition, it may be desirable to achieve this change in momentum very rapidly. Accordingly, the length of the bore 110 should be relatively short, but yet provide a confined volume in which the change in momentum occurs. In this regard, it is believed that the more rapid the change in momentum, the higher the deceleration/acceleration of the fluid, and the higher the static pressure generated within the fluid stream (at least up to the point where the static pressure head equals the velocity head of the incoming fluid stream). By way of example, the length of the bore 110 may be correlated to the cross-sectional area of the liquid $A_l$. In particular, if $r_c$ is a hypothetical radius of a conduit having a cross-sectional area of $A_l$ carrying only the liquid, then the length of the bore 110 should be greater than approximately $0.36r_c$. For example, a bore 110 having a length of approximately $0.5r_c$ may be used. Larger lengths may also be used but may decrease the rate of bubble collapse. Those of ordinary skill in the art will appreciate that other dimensions (e.g., cross-sectional area and/or length) may be utilized with reaction chamber 102 to increase the fluid pressure and facilitate collapse of the cavitation bubbles.

The cylindrical bore 110 provides for a change in momentum, wherein the fluid is turned a full 180 degrees, within the constrained volume defined by the blind bore 110. It is believed, therefore, that the rapid pressure rise that results will collapse the cavitation bubbles in the fluid flow stream in a more violent manner so as to provide the benefits discussed above.

Figure 6:
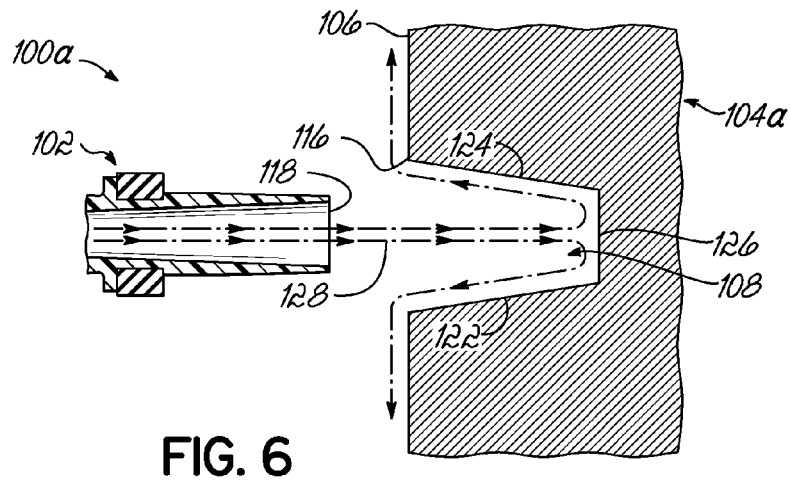
FIG. 6 is a side elevational view of a liquid treatment apparatus, in partial cross section, incorporating a reaction chamber in accordance with another embodiment of the invention.

In an alternative embodiment shown in FIG. 6, wherein like reference numerals refer to like features shown in FIG. 5, the reaction chamber 104a includes cavity 108 defined by a blind bore 122 having a side wall 124 and a base wall 126. Unlike the previous embodiment, wherein the bore 110 had a substantially constant cross-sectional area along the length of the bore 110, the side wall 124 of bore 122 is tapered such that the cross-sectional area decreases in a direction from the inlet 116 and toward the base wall 126. The bore 122 may have a circular cross-sectional shape but other shapes are also contemplated to be within the scope of the invention.

The liquid treatment apparatus 100a utilizing the tapered bore 122 operates in a manner similar to that discussed above. In this regard, the inlet 116 to bore 122 is positioned adjacent the outlet 118 of cavitation generator 102 and the fluid flow therefrom is directed through inlet 116 and into the otherwise closed cavity 108. The fluid flow from the cavity generator 102 includes a relatively large velocity head and a relatively low pressure head to facilitate bubble generation in the liquid. As illustrated schematically by flow lines 128, the fluid flow from cavitation generator 102 flows through inlet 116 and interacts with base wall 126 of tapered bore 122. It is believed that the flow stream contacts the base wall 126, is brought to rest or nearly brought to rest, and is redirected back toward the inlet 116 of the bore 122. The side wall 124 constrains the volume in which the transfer of energy from the velocity head to the pressure head takes place and, like the previous embodiment, results in a 180 degree reversal of the fluid flow and thus maximizes the change in momentum.

Similar to the above, the cross-sectional area of the bore 122 at the inlet 116 should be greater than the cross-sectional area of the flow stream entering inlet 116 so as to accommodate fluid flow both entering and exiting the bore 122. In one embodiment, the cross-sectional area of the bore 122 at the inlet 116 may be given by $A_i=2A_l+A_g$. The length of the bore 110 should be relatively short, but yet provide a confined volume in which the transfer of energy from the velocity head to the pressure head occurs. By way of example, the length of the bore 110 may be the same as in the previous embodiment. Furthermore, the cross-sectional area of the base wall 126 is less than the cross-sectional area of the inlet 116 and may be approximately equal to the cross-sectional area of the incoming fluid stream.

The tapered configuration of bore 122 provides an increased confinement of the fluid in the region where the energy is transferred from the velocity head to the pressure head, yet allows the liquid to escape from the bore 122 by forming the inlet 116 thereof larger than the incoming fluid stream. Moreover, it is believed that by tapering the side wall 124 of the bore 122, the pressure on the fluid stream is increased at a greater distance from the base wall 126 as compared to a constant cross-sectional area bore. Accordingly, bubble collapse may start occurring away from base wall 126, which for reasons explained in more detail below, may be desirable. Furthermore, by varying the taper angle of the side wall 124 and/or the length of bore 122, better control of bubble collapse may be achieved.

In any event, the tapered bore 122 provides for a change in momentum, wherein the fluid is turned a full 180 degrees, within the constrained volume defined by the blind tapered bore 122. It is believed, therefore, that the rapid pressure rise that results will collapse the cavitation bubbles in the fluid flow stream in a more violent manner so as to provide the benefits discussed above.

While the reaction chambers 104, 104a discussed above increase the efficiency in collapsing the cavitation bubbles generated by cavitation generator 102 to achieve certain benefits, it may also be desirable to increase the turbulence and mixing of the fluid. For example, increasing the turbulence or mixing of the fluid may enhance various chemical reactions taking place in the fluid. In the reaction chambers 104, 104a, the fluid flow is reversed a full 180 degrees such that the angle of incidence between the in flow and exit flow is approximately zero. It is believed that a low angle of incidence between the inlet and exit streams diminishes the amount of turbulence and mixing that might otherwise be achieved in the fluid. Therefore, it may be desirable to design a reaction chamber that not only provides for increased efficiency in bubble collapse, but also provides for enhanced turbulence and mixing of the fluid.

Figure 7:
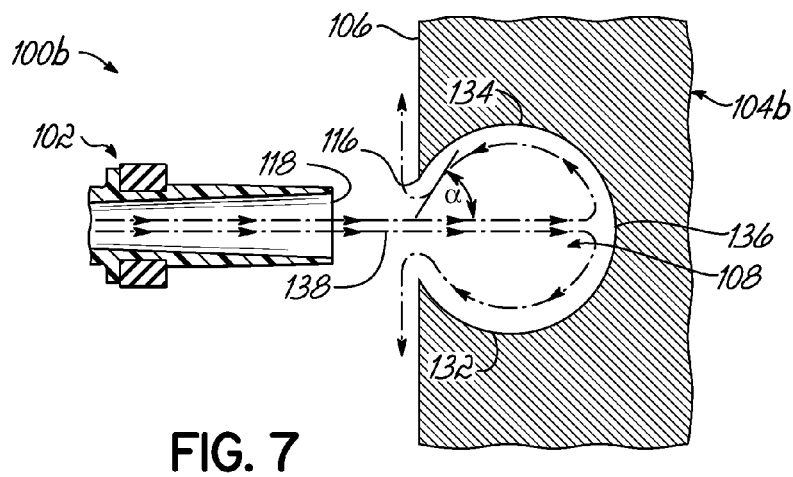
FIG. 7 is a side elevational view of a liquid treatment apparatus, in partial cross section, incorporating a reaction chamber in accordance with another embodiment of the invention.

A reaction chamber 104b designed to provide the benefits of reactions chambers 104, 104a discussed above and increase turbulence and mixing of the fluid is shown in FIG. 7, in which like reference numerals refer to like features in FIG. 5. In this embodiment, the reaction chamber 104b includes a cavity 108 defined by a generally arcuate (e.g., spherical, tear shaped, bulbous, etc.) blind bore 132 having smooth, arching side wall 134 and a base wall 136. There may or may not be any discernible divide between the side wall 134 and base wall 134. Additionally, the bore 132 may be characterized in that a maximum cross dimension of the bore 132 is intermediate the inlet 116 and the base wall 136. Again, the bore 132 may have a circular cross-sectional shape, but other shapes are also contemplated to be within the scope of the invention.

The liquid treatment apparatus 100b utilizing the generally arcuate bore 132 operates in a manner similar to that discussed above. In this regard, the inlet 116 to bore 132 may be positioned adjacent the outlet 118 of cavitation generator 102 and the fluid flow directed through inlet 116 and into the otherwise closed cavity 108. The fluid flow from the cavity generator 102 includes a relatively large velocity head and a relatively low pressure head to facilitate bubble generation in the liquid. As illustrated schematically by flow lines 138, the fluid flow from cavitation generator 102 flows through inlet 116 and interacts with base wall 136 of arcuate bore 132. It is believed that the flow stream contacts the base wall 136, is brought to rest or nearly brought to rest, and is redirected back toward the inlet 116 of the bore 132 along the side wall 134. The side wall 134 constrains the volume in which the transfer of energy from the velocity head to the pressure head takes place and, like the previous embodiments, results in a reversal of the fluid flow toward the inlet 116 and a change in momentum.

Unlike the previous embodiments, however, the side wall 134 is configured to direct the fluid flow which has interacted with base wall 136 (e.g., the return flow) so as to intersect the incoming fluid stream at a relatively large angle of incidence, as illustrated by angle α in FIG. 7. By way of example, the angle of incidence may be between approximately 30 degrees and 90 degrees. The relatively large angle of incidence between the inlet and exit streams provides for collisions between the fluid particles of the two streams that enhance turbulence and mixing within the fluid (e.g., inlet stream and return flow stream). Larger angles of incidence are expected to provide increased turbulence and mixing.

In addition to the above, the reaction chamber 104b may provide additional benefits. For example, the configuration of arcuate bore 132 may increase the fraction of cavitation bubbles that collapse. In this regard, when the inlet fluid stream interacts with base wall 136, the cavitation bubbles along the central portion of the incoming fluid stream are subjected to the largest transfer of energy from the velocity head to the pressure head and thus, are more likely to collapse. The cavitation bubbles along the outer portion of the incoming fluid stream may be deflected radially outward such that there is less of an energy transfer to the pressure head. Accordingly, a number of cavitation bubbles in this region may not collapse. As illustrated in FIG. 7, the return flow interacts with the incoming fluid stream along its outer region. When the fluid particles between the two streams collide, there is an increase in the localized pressure. This localized pressure rise may be sufficient to initiate bubble collapse in the incoming fluid stream, especially within the outer region thereof. Thus, cavitation bubbles that may otherwise not have collapsed through interaction with base wall 136 may collapse by directing the return flow to intersect the incoming fluid stream. Furthermore, directing the return flow to intersect the incoming fluid stream may initiate bubble collapse away from the base wall 136, which for reasons discussed in more detail below may be desirable.

As is well recognized, it may be undesirable to collapse bubbles near solid surfaces. As discussed above, the collapse of cavitation bubbles generate high, localized temperatures and pressures. In many cases, bubble collapse generally occurs in an asymmetric fashion, due to, for example, asymmetric pressure fields, resulting in the creation of high speed micro-jets of fluid. Impingement of the micro-jets on a solid surface in proximity to an asymmetric bubble collapse may result in erosion (pitting, cracking, etc.) of the solid surface. In some applications, the erosion of the solid surface may not be problematic. For example, it may be possible to replace an eroded solid surface with relative ease and without any significant burden (e.g., labor costs, material costs, downtime, etc.). In other applications, however, the burden of eroding or otherwise damaging a solid surface in proximity to collapsing bubbles may be appreciable. Therefore, it may be desirable to avoid or reduce the possibility of cavitation bubbles collapsing near a solid surface, such as base walls 114, 126, and 136 of reaction chambers 104, 104a, and 104b, respectively.

Figure 8:
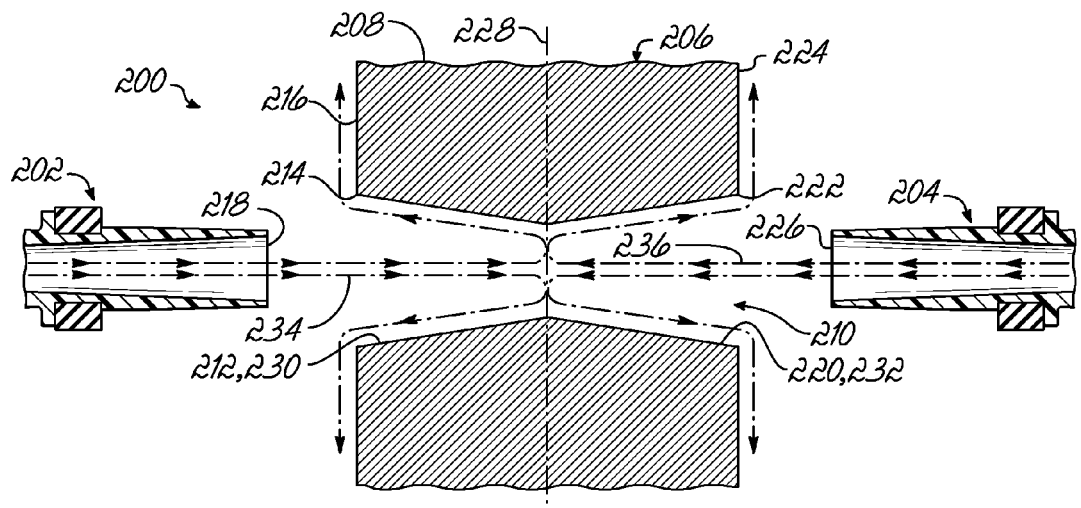
FIG. 8 is a side elevational view of a liquid treatment apparatus, in partial cross section, incorporating a reaction chamber in accordance with another embodiment of the invention.

FIG. 8 illustrates an embodiment of a liquid treatment apparatus 200 having a reaction chamber that eliminates or reduces the possibility of bubble collapse near a solid wall and therefore avoids or diminishes erosion of the reaction chamber and the problems associated therewith. In this regard, liquid treatment apparatus 200 includes opposed first and second cavitation generators 202, 204, and a reaction chamber 206 in proximity to the cavitation generators 202, 204. In one embodiment, the cavitation generators 202, 204 may include modified cyclonettes 10 as discussed above, or may be other cavitation generators as known in the art.

The reaction chamber 206 includes a wall 208 having a cavity 210 formed therein. The cavity 210 includes a first cavity portion 212 having an inlet 214 adjacent a surface of a first wall portion 216 that is positioned adjacent an outlet 218 of first cavitation generator 202. In this way, the fluid flow from generator 202 is directed through the inlet 214 and into the first cavity portion 212. The cavity 210 further includes a second cavity portion 220 having an inlet 222 adjacent a surface of a second wall portion 224 that is positioned adjacent an outlet 226 of second cavitation generator 204. In this way, the fluid flow from the generator 204 is directed through the inlet 222 and into the second cavity portion 220. The first and second cavity portions 212, 220 intersect each other, such as along a plane 228 (shown in dash in FIG. 8), so that the fluid streams from the fluid generators 202, 204 intersect one another. By way of example, in one embodiment, the fluid streams may intersect each other at approximately 180 degrees (e.g., directly opposed to each other), as illustrated in FIG. 8.

The first cavity portion 212 may be configured as a tapered bore 230 similar to that shown in FIG. 6 and second cavity portion 220 may also be configured as a tapered bore 232. However, instead of having a base wall that interacts with the incoming fluid stream, the base wall has been removed so that the incoming fluid streams react with each other. If the two fluid streams intersect at approximately 180 degrees and have similar fluid characteristics, including density and velocity, then the fluid streams respond or behave as if hitting a solid wall, but with no solid wall being present. Accordingly, the flow lines 234, 236 in first and second cavity portions 212, 220, respectively, are each similar to flow lines 128 shown in FIG. 6. Moreover, the length of cavity 210 may be double the values of the cavities discussed above. Thus, in one embodiment, the length may be approximately $r_c$.

As a result of the configuration of reaction chamber 206, the benefits afforded by tapered bores 230, 232 are similar to those discussed above with reference to FIG. 6, but the possibility of erosion of the reaction chamber 206 has been eliminated or significantly reduced. Additionally, turbulence and mixing may be enhanced using colliding fluid streams. As discussed below, this may be useful to improve chemical reaction kinetics. While the first and second cavity portions 212, 220 were configured as tapered bores, those of ordinary skill in the art will recognize that the right cylindrical bore 110 or generally arcuate bore 132 shown in FIGS. 5 and 7, respectively, may also be used to form cavity portions 212, 220.

The opposed fluid stream configuration illustrated in FIG. 8 may provide additional benefits. For example, it is believed that replacing a stationary object (e.g., base wall) with a moving object (e.g., opposed fluid stream) increases the rate of bubble collapse within the fluid streams. As the maximum temperature and pressure achieved within the collapsing bubble are related to the rate of bubble collapse, providing for a quicker collapse results in higher temperatures and pressures. Quicker bubble collapse may also result in a lower fraction of heat loss to the surrounding fluid. The opposed fluid configuration may also reduce energy consumption. Additionally, if the fluid streams contain particles of higher density than their surrounding fluid medium, when the fluid streams intersect and reverse direction, the higher density particles tend to continue in their previous direction (e.g., straight direction) as compared to the less dense fluid particles which change direction. This introduces shear between the particles and the surrounding fluid which may result in improved chemical reaction kinetics. For example, it is believed that if the particles are being used to catalyze a reaction, the presence of mobile catalysts in a high shear zone where cavitation bubble collapse is occurring will further improve the reaction kinetics. Furthermore, cavitation bubble collapse would tent to "clean" the surface of catalyst particles and thus improve reaction kinetics. Still further, in some applications, it may be desirable to reduce the size of the particles. In such applications, it is believed that directing the fluid streams to meet in opposition to each other within a cavitation bubble collapse zone (e.g., within the cavity of the reaction chamber) will increase impact intensity and hence improve "milling" of the particles.

Figure 9:
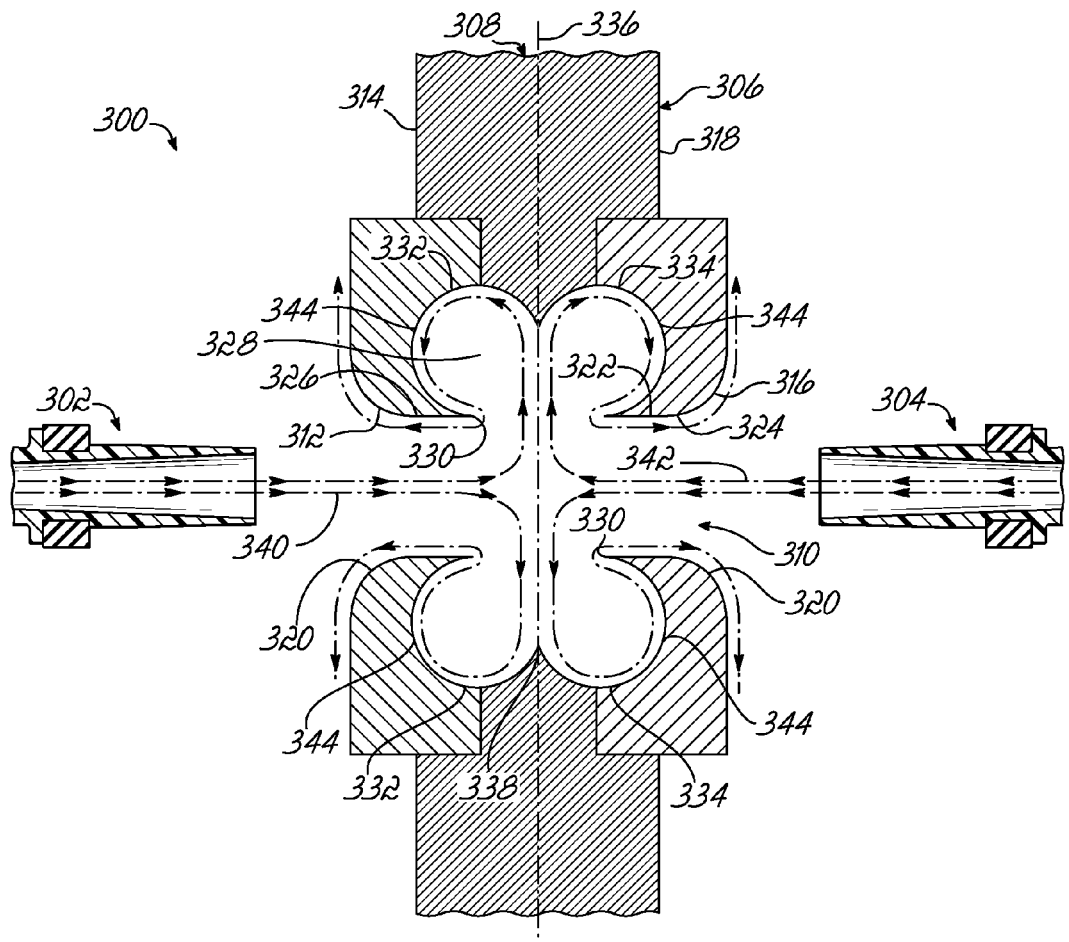
FIG. 9 is a side elevational view of a liquid treatment apparatus, in partial cross section, incorporating a reaction chamber in accordance with another embodiment of the invention.

Another embodiment that utilizes an opposed flow stream configuration to reduce or eliminate erosion of the reaction chamber is shown in FIG. 9. This embodiment also provides for enhanced turbulence and mixing of the fluid. In this regard, liquid treatment apparatus 300 includes first and second opposed cavitation generators 302, 304, and a reaction chamber 306 in proximity to the cavitation generators 302, 304. In one embodiment, the cavitation generators 302, 304 may include modified cyclonettes 10 as discussed above, or may be other cavitation generators as known in the art.

The reaction chamber 306 includes a wall 308 having a cavity 310 formed therein. The cavity 310 includes a first inlet 312 adjacent a surface of a first wall portion 314 and a second inlet 316 adjacent a surface of a second wall portion 318. The first and second inlets 312, 316 may include chamfers 320 to form a smooth transition between the cavity 310 and the first and second wall portions 314, 318. Fluid flow from first cavitation generator 302 is directed through first inlet 312 and into cavity 310 and fluid flow from the second cavitation generator 304 is directed through second inlet 316 and into cavity 310 such that the fluid streams intersect one another. By way of example, in one embodiment, the fluid streams may intersect each other at approximately 180 degrees (e.g., directly opposed to each other), as illustrated in FIG. 9.

The cavity 310 includes a side wall 322 that defines a channel 324 extending between the first and second inlets 312, 316. In one embodiment, the channel 324 may include a generally constant cross-sectional area portion 326 extending inward from each of the inlets 312, 316. A central portion of the channel 324 includes an outwardly extending (e.g., radially extending) chamber 328 disposed in side wall 322. The chamber 328 includes an opening 330 in fluid communication with channel 324. The chamber 328 has a multi-lobe configuration including a first lobe 332 and a second lobe 334, which may be symmetrical about a central plane 336, as shown in dash in FIG. 9. A flow divider 338 may be disposed in the chamber 328 for guiding or separating the flow stream into one of the lobes 332, 334.

The flow lines 340, 342 illustrate operation of the liquid treatment device 300. In this regard, the fluid flow from first generator 302 enters inlet 312 and fluid flow from second generator 304 enters inlet 316 so as to intersect the first fluid stream generally along central plane 336. The fluid particles collide thereat transferring the velocity head of the flows into pressure head. Accordingly, the internal pressure of the fluid rapidly increases thereby causing the cavitation bubbles to collapse. As explained above, the fraction of bubbles that collapse is generally the highest along the central part of the fluid flow streams and decreases toward the outer portion of the streams.

As explained previously, the colliding streams behave in a manner similar to when contacting a perpendicular flat plate. Accordingly, the flow is directed generally radially outward and flows through the opening 330 in chamber 328. The flow divider 338, which may have a sharp point to reduce stagnation, divides the flow into a respective lobe 332, 334. The fluid then flows along the generally arcuate wall 344 of the lobes 332, 334 so as to intersect the fluid flow stream entering the opening 330 in the chamber 328. This intersection occurs at a relatively high angle of incidence (see FIG. 7). The fluid then flows out of the chamber 328 adjacent the edges of the opening 330 and flows back toward the inlets 312, 316 along a region adjacent the side wall 322 of channel 324. The flow then exits the reaction chamber 306 along the outer edges of inlets 312, 316.

The configuration shown in FIG. 9 provides a number of benefits. As an initial matter, because the liquid treatment apparatus 300 utilizes an opposing fluid flow configuration, erosion of the reaction chamber 306 is eliminated or reduced. In this regard, a significant fraction of bubble collapse occurs along central plane 336 where the two fluid streams intersect. As the cross-sectional area of channel 324 is larger than the cross-sectional area of the fluid streams entering the cavity 310 (so as to accommodate both inlet and return flows), this collapse is away from side wall 322. Moreover, any bubbles that do not collapse on impact between the two fluid streams, such as along the outer region of the streams, may be collapsed at the opening 330 of chamber 328 due to the intersection of the fluid stream with itself. As explained above, when the fluid particles collide as a result of the intersection, the internal pressure increases, which in turn may collapse any remaining cavitation bubbles along the outer region of the fluid streams.

As explained above, a relatively large angle of incidence exists between the incoming and exiting fluid from chamber 328. Thus, another benefit to the configuration shown in FIG. 9 is that turbulence and mixing of the fluid is enhanced. In addition to these, the fluid flowing toward the inlets 312, 316 adjacent the side wall 322 provides a layer of fluid (for which the cavitation bubbles have already been collapsed) that further shields the reaction chamber 306 from erosion and other damage as a result of bubble collapse.

Although not shown, in another embodiment, the chamber 328 may be configured to direct the fluid flow that enters the chamber 328 after the first and second fluid flow streams 340, 342 collide to intersect one of or both the incoming first and second fluid flow streams 340, 342 (such as along the outer portion thereof). It is believed that such a configuration would generally result in a greater fraction of cavitation bubbles in the outer regions of these streams collapsing. However, as compared to the configuration shown in FIG. 9 (e.g., intersecting the radially moving flow after collision instead of the incoming flow), turbulence and mixing may be lessened. This may be due, at least in part, to the velocity of the return flow having a component in the direction of the inlets.

Figure 2:
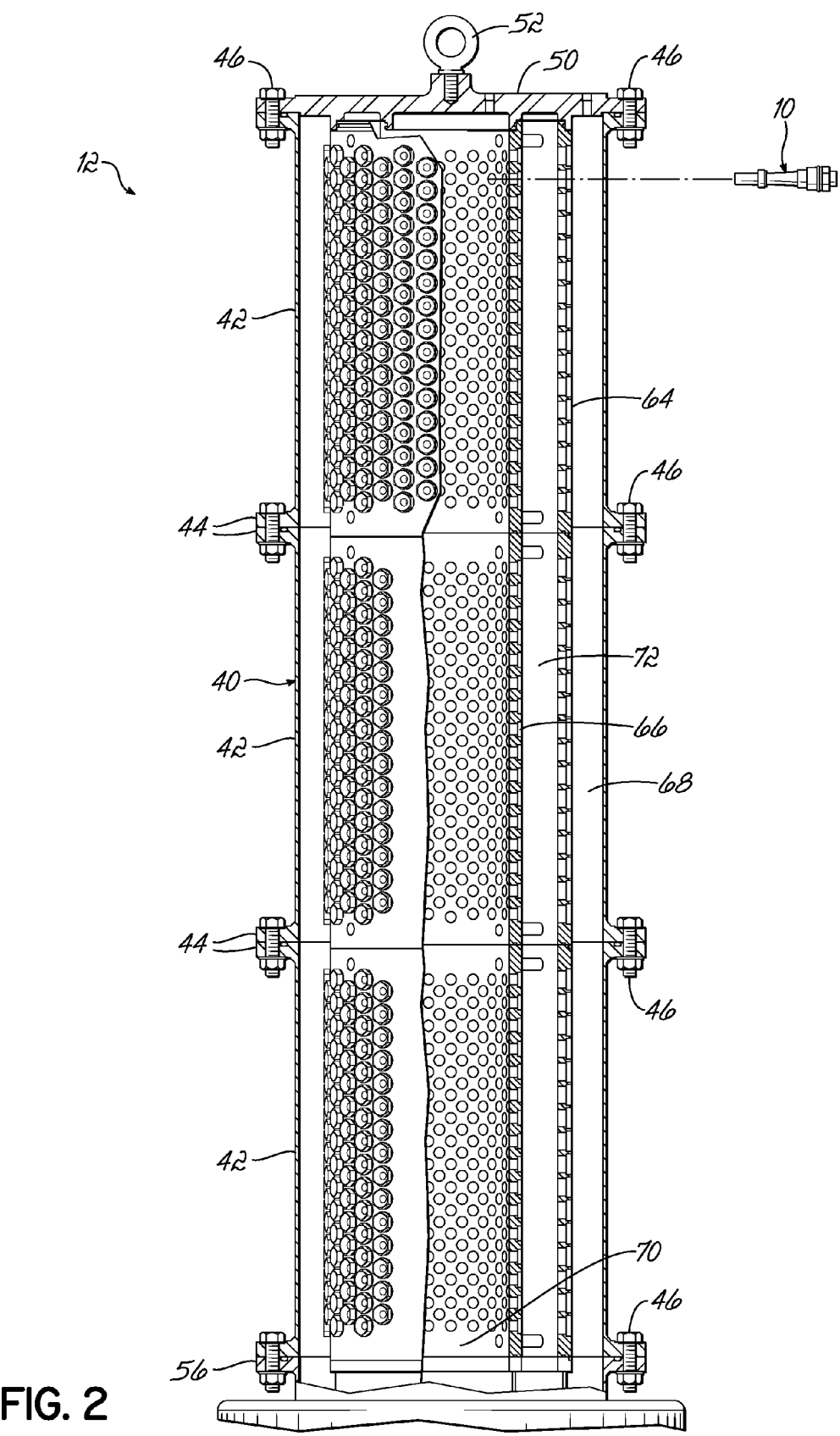
FIG. 2 is an elevational view, partly in section, illustrating an array of cyclonettes modified to generate hydraulic cavitation.
Figure 3:
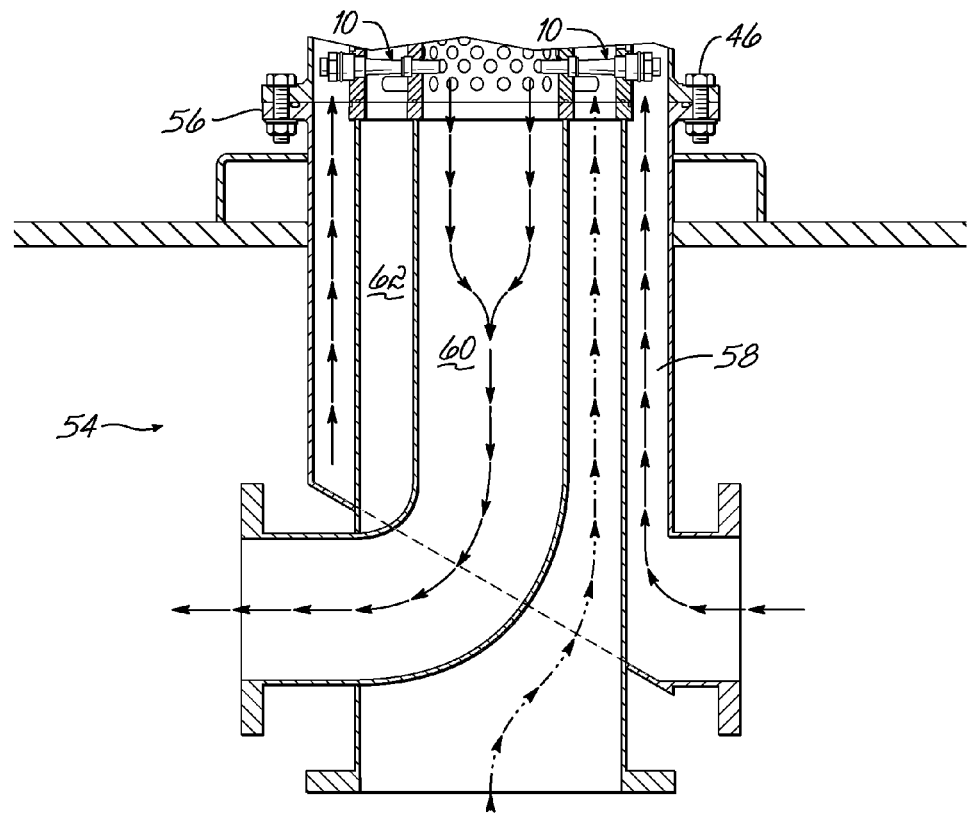
FIG. 3 is an elevational view of the lower end of the device of FIG. 2 and with the cooperating inlet and outlet flow manifolds.
Figure 4:
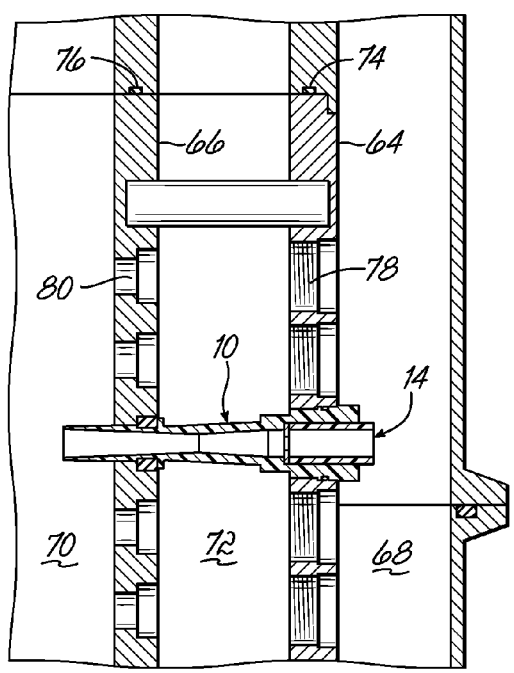
FIG. 4 is a cross-sectional view of a portion of FIG. 2 illustrating in greater detail the positioning of a modified cyclonette.
Figure 10:
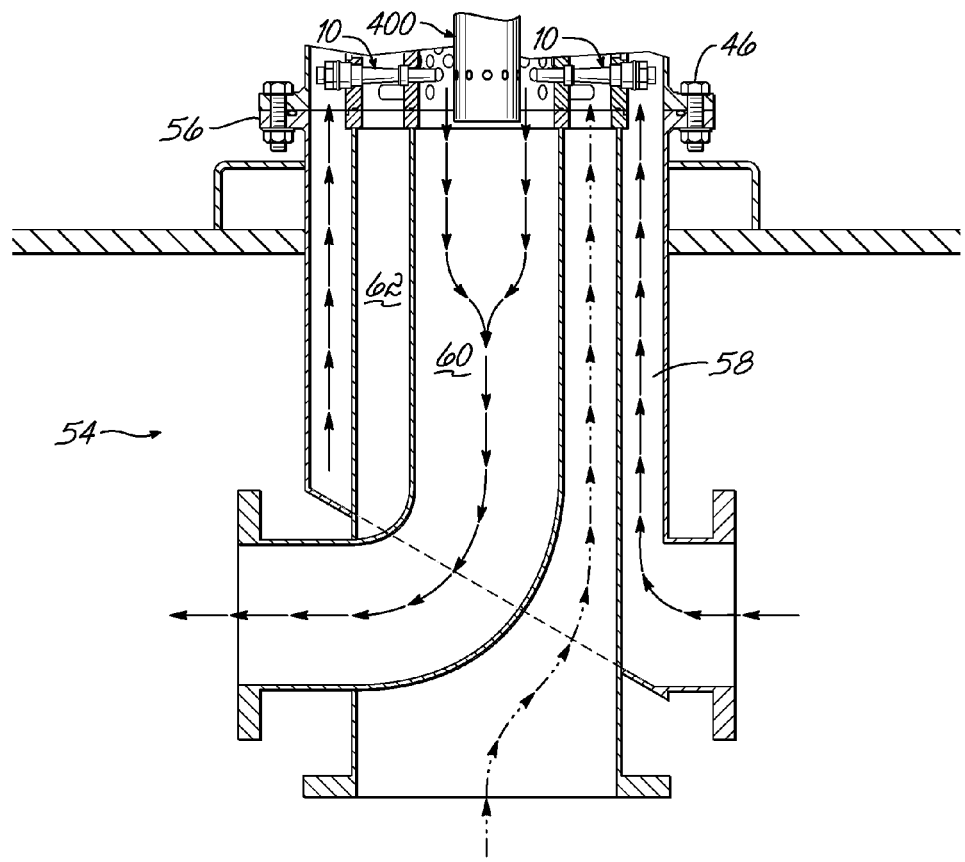
FIG. 10 is a view similar to FIG. 2 but including a reaction chamber insert.
Figure 11:
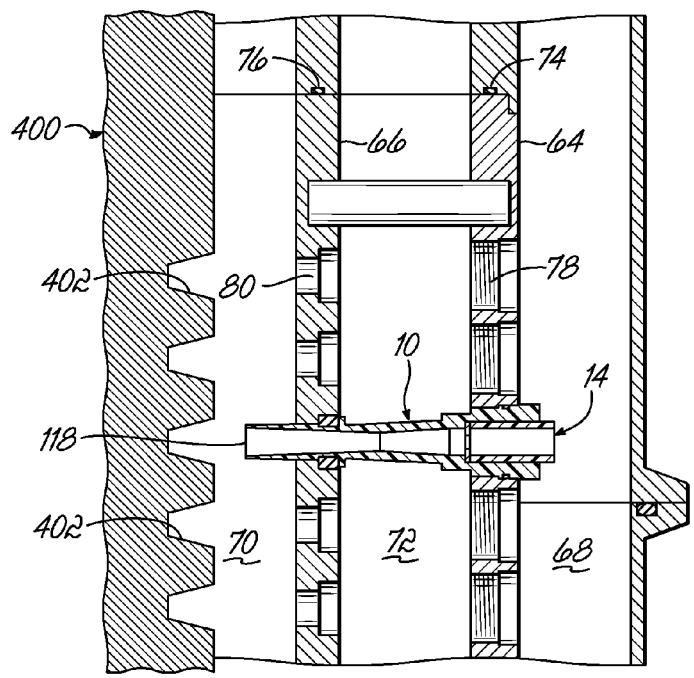
FIG. 11 is a view similar to FIG. 4 but including a reaction chamber insert.

In one aspect of the invention, the liquid treatment apparatus 12 as shown and described in FIGS. 2-4 and more fully disclosed in U.S. Publication No. 2008/0099410 may be modified so as to receive the benefits afforded by a reaction chamber in accordance with one or more of the embodiments described above. As shown in FIGS. 10 and 11, in which like reference numerals refer to like features in FIGS. 3 and 4, liquid treatment apparatus 12 may include a generally cylindrical reaction chamber insert 400 disposed within the inner chamber 70 of apparatus 12. In one embodiment, the reaction chamber insert 400 includes a plurality of blind bores 402 each in proximity to an outlet 118 of a corresponding modified cyclonette 10. The apparatus 12 essentially operates in same manner as previously explained in U.S. Publication No. 2008/0099410, but with the inclusion of insert 400, gets the benefit afforded by the use of a reaction chamber and described above.

While the insert 400 is shown having the blind bores 402 configured as tapered bores, similar to that shown in FIG. 6, those of ordinary skill in the art will recognize that the blind bores 402 may be straight cylindrical bores and/or generally arcuate bores. Moreover, those of ordinary skill in the art will recognize that while insert 400 is shown as utilizing a blind bore configuration, the reaction chamber insert may also make use of the opposed fluid flow configuration described above.

Aspects of the invention as described herein may be beneficial to a variety of industrial applications that rely on chemical reactions to achieve an end product. In particular, through a combination of cavitation and/or the use of a reaction chamber to accelerate/decelerate a bubble-laden medium, to constrain bubble collapse, and/or increase turbulence and mixing, chemical reactions may be enhanced. For example, it is believed that the chemical reactions may be accelerated potentially by orders of magnitude as compared to rates typically achieved in stirred tanks. By way of example, in one application it is believed that a starch oxidation process that normally takes between about 6-8 hours in a stirred tank batch reactor may be performed continuously using cavitation in combination with a reaction chamber. In another application, it is believed that the conversion of vegetable oil to biodiesel at room temperature, which may require several hours in a stirred tank, may also be performed continuously using cavitation in combination with a reaction chamber.

The ability to convert batch type of chemical reaction into a continuous reaction has many benefits. For example, a continuous reaction provides improved quality control. In this regard, maintaining batch-to-batch consistency is often difficult and problematic. Continuous reactions, on the other hand, promote consistent quality upon maintaining the appropriate operating parameters. Additionally, continuous reactions are less susceptible to side chain reactions that may diminish quality. Still further, in continuous chemical reactions the amount of process tank volume is typically significantly reduced. This in turn, may provide for reduced inventory and capital costs. Moreover, in various food processes, reduced tank volumes reduce the risk of product contamination and continuous reactions reduce residence time for the growth of contaminating microorganisms.

In addition to these, there may be other benefits. For example, it is believed that another benefit is that chemical consumption will be reduced when using cavitation in combination with a reaction chamber. In this regard, it is believed that the increased efficiency in collapsing the cavitation bubbles (and the resulting increases in pressure and temperatures) will require a lesser amount of chemical to achieve a similar result in the treated liquid. Less chemical consumption provides for cost savings in the chemicals themselves and may further reduce costs associated with handling of the chemicals either before or after treatment of a liquid. For example, in some applications, post chemical treatment processes may constitute a major portion of the costs of a manufacturing process.

While embodiments described herein include both the use of cavitation and a reaction chamber, the invention is not so limited. For example, it is believed that the turbulence and mixing aspects of the reaction chamber may provide some increase in chemical reactions regardless of whether cavitation is used or not. Accordingly, the apparatus described above that facilitates turbulence and mixing (e.g., FIGS. 7 and 9) may include nozzle assemblies in place of the cavitation generators and attain at least some of the benefits described herein, including increased chemical reactions or enhanced mixing of the fluid itself.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in numerous combinations depending on the needs and preferences of the user.

What is claimed is:

1. An apparatus for treating a liquid comprising:
   outer, intermediate, and inner cylinders positioned concentrically with respect to each other, the outer, intermediate, and inner cylinders defining an outer annular chamber, an intermediate chamber, and an inner, central chamber;
   an outer feed channel supplying liquid being treated to the outer annular chamber;
   first and second flow generators having a unidirectional flow channel extending therethrough from adjacent an upstream end to adjacent a downstream end thereof mounted in the intermediate cylinder with the upstream ends of the flow generators communicating with the annular outer chamber to receive liquid therefrom and the downstream ends thereof communicating with the inner, central chamber;

the first flow generator having an outlet in the downstream end for generating a first flow stream of the liquid being treated, wherein the first flow generator is a cavitation generator adapted to generate a first flow stream including multiple cavitation bubbles or wherein the first flow generator is a nozzle adapted to generate a first flow stream substantially devoid of cavitation bubbles;

the second flow generator having an outlet in the downstream end for generating a second flow stream of the liquid being treated;

a reaction chamber positioned in the inner, central chamber and spaced apart from and positioned in proximity to the outlet of the first flow generator, the reaction chamber having an external wall including a cavity formed therein, the cavity having a first inlet situated in a confronting relationship with the outlet so that the cavity receives the first flow stream directly from the outlet of the first flow generator and wherein the received first flow stream is redirected in the cavity back towards the first inlet and out the cavity; and a central, outwardly-flowing channel receiving liquid treated by the first and second flow generators.

2. The apparatus of claim 1, wherein the second flow generator is directly opposed to the first flow generator.

3. The apparatus of claim 1, wherein the cavity includes a second inlet adapted to receive the second flow stream, the first and second flow streams intersecting each other within the cavity.

4. The apparatus of claim 1, wherein the cavity includes a first cavity portion and a second cavity portion in fluid communication with the first cavity portion.

5. The apparatus of claim 4, wherein each of the first and second cavity portions is selected from the group consisting of a cylindrical bore, a tapered bore, and a generally arcuate bore.

6. The apparatus of claim 1, wherein the cavity further comprises:

a flow channel defined by a side wall and having the first inlet adapted to receive the first flow stream and a second inlet adapted to receive the second flow stream, the first and second flow streams intersecting each other within the cavity; and a chamber disposed in the side wall of the flow channel, the chamber adapted to receive the fluid streams after intersection thereof.

7. The apparatus of claim 6, wherein the chamber includes a multi-lobed configuration.

\* \* \* \* \*